F. G. TERWILLIGER.
CATTLE STANCHION.
APPLICATION FILED APR. 10, 1918.
1,276,449.
Patented Aug. 20, 1918.
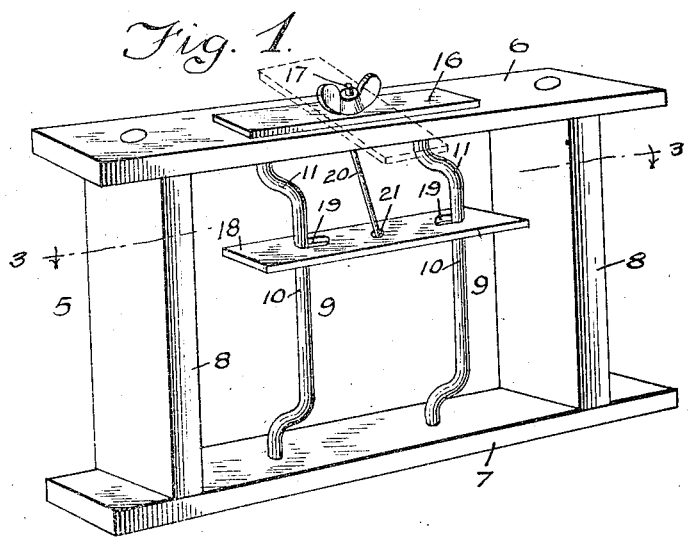
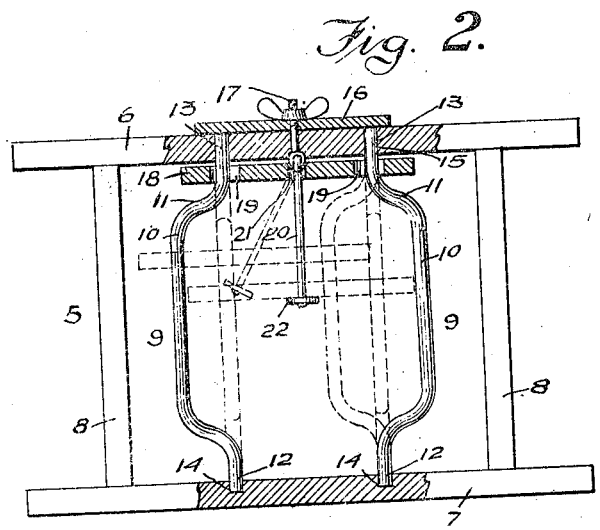
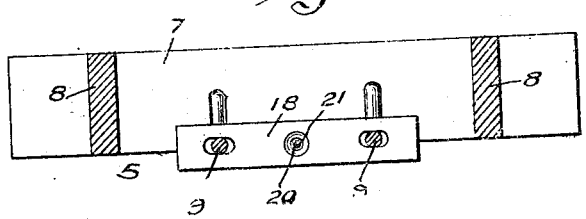
INVENTOR
Fred G. Terwilliger
BY
Victor J. Evans
ATTORNEY

UNITED STATES PATENT OFFICE.

FRED G. TERWILLIGER, OF ALMOND, NEW YORK.

CATTLE-STANCHION.

1,276,449.

Specification of Letters Patent. Patented Aug. 20, 1918.

Application filed April 10, 1918. Serial No. 227,762.

*To all whom it may concern:*

Be it known that I, FRED G. TERWILLIGER, a citizen of the United States of America, residing at Almond, in the county of Allegany and State of New York, have invented new and useful Improvements in Cattle-Stanchions, of which the following is a specification.

This invention relates to cattle stanchions and has for its principal object the provision of means which may be readily applied to or removed from the neck of an animal and which will include novel instrumentalities whereby the animal may very conveniently assume most any desired position while the stanchion is applied.

Another object of the invention is to provide a stanchion consisting of a suitable frame having head receiving bars mounted to rotate therein and adapted to be engaged against the sides of the neck of an animal, and means associated with said bars for maintaining their operative association with the neck of the animal and for preventing the bars from being shifted from their intended positions by the possible exertion of pressure which may be applied thereto by the animal.

Another object of the invention is to provide a cattle stanchion including rotary neck engaging bars and means for holding the bars operatively related to each other and against relative separation from the neck of the animal, while designing said means whereby it can conveniently be adjusted manually to permit the bars to be separated relatively when it is desired to remove the stanchion from the neck of the animal.

With the above and other objects in view which will appear as the nature of the invention is better understood, the same consists in the improved construction and novel arrangement of parts which will hereinafter be fully described and particularly pointed out in the claims.

In the accompanying drawings, has been illustrated, a single and preferred form of the invention, it being, however, understood that no limitations are necessarily made to the precise structural details therein exhibited, but that changes, alterations and modifications within the scope of the claims may be resorted to when desired.

Figure 1, is a front view of the stanchion showing the rotary bars in head confining positions.

Fig. 2, is a view similar to Fig. 1, showing the bars separated when it is desired to remove the stanchion from the head of the animal.

Fig. 3, is a transverse section on line 3—3, of Fig. 1.

The invention comprises a frame 5, which includes upper and lower sills 6 and 7, and rigid connecting side bars 8—8. This frame supports companion yoke bars 9—9, of identical construction. These bars are each provided with an intermediate relatively long vertical branch 10, offsets 11—11, and vertical pintle or trunnion branches 12 and 13, which are extended from said offset portions 11. The lower extension 12, of each of said bars is mounted for free rotation in a vertical passage 14, in the sill 7, while the extension 13, of each bar is mounted for free rotation in an opening 15, in the upper sill 6. A keeper plate 16, is pivoted at 17, to the sill 6, and the ends of said keeper are adapted to overlie the openings 15, in the top sill and thereby hold the yoke bars 9—9, against vertical displacement. When the keeper is turned at right angles to the position shown in Fig. 1, and as illustrated in dotted lines, the yoke bars may be lifted from the passages 14, and entirely withdrawn from the frame 5, as will be readily understood.

A sliding latch plate 18, is mounted on the bars 9—9, the same having elongated slots 19, in which said bars are received. When said latch plate is arranged in the position shown in full lines in Fig. 1, the bars 9—9, are held against any appreciable relative separation and as a consequence thereof, the yoke bars are maintained in operative clamping connection with the neck of the animal. By providing bars 9—9, which are free to rotate in the sills 6 and 7, and through the fact that said bars are connected with a latch plate of the character illustrated at 18, it will be observed that the animal may assume many desired positions and the maximum freedom while the stanchion is in place.

The latch plate 18, is slidably connected with a swinging support 20, the latter being in the nature of a rod which is hung from the sill 6, at a point between the yoke bars 9—9, the lower end of said rod being extended through a relatively large opening 21, in the latch plate and at the lower end and beneath said plate the bar is provided with a fixed enlargement 22. This enlargement directly overlies the neck of the animal when the stanchion is applied and is designed to hold the latch plate against being accidentally released by movements of the head of the animal.

When it is desired to remove the stanchion from the animal the latch plate is drawn in an upward direction and to a position above the offsets 11—11, beneath the sill 6. It will now be observed that said latch plate is associated with the extensions 13, of the yoke bars and incident thereto said bars are free to be opened or separated relatively to the positions shown in full lines in Fig. 2. The dotted line illustrations shown in Fig. 2, indicate the many different positions in which the yoke bars are adapted to be placed while the stanchion is on the neck of the animal.

What is claimed as new is:

1. A cattle stanchion comprising a frame, yoke bars mounted to revolve in said frame and provided with offset ends and parallel intermediate neck engaging portions, a sliding latch plate freely received by said bars, and means for confining said plate against said intermediate portions of said bars to maintain confinement of said bars against the neck of the animal.

2. A cattle stanchion comprising a frame, yoke bars mounted to revolve in said frame and provided with offset ends and parallel intermediate neck engaging portions, a sliding latch plate freely received by said bars, means for confining said plate against said intermediate portions of said bars to maintain confinement of said bars against the neck of the animal, said means having a portion underlying the plate and serving to contact with the neck of the animal and prevent displacement of the plate when the head of the animal is raised.

3. A cattle stanchion comprising a frame, yoke bars having upper offset ends mounted to rotate in the top of the frame and lower offset ends mounted to rotate in the base of the frame, a latch plate adjustable over the upper offset ends and on the bars beneath said ends, and serving when associated with said upper ends to permit the bars to be adjusted relatively and further operating when engaged with the bars below said ends to hold the bars in confinement with the neck of the animal and a support for said plate.

4. A cattle stanchion comprising a frame, yoke bars having upper offset ends mounted to rotate in the upper portion of the frame, a latch plate adjustable over the upper offset ends and on the bars beneath said ends, and serving when associated with said upper ends to permit the bars to be adjusted relatively and further operating when engaged with the bars below said ends to hold the bars in confinement with the neck of the animal, lower offset ends formed on said bars and supported from the base of the frame, a support for said plate, the upper and lower ends of said yoke bars having detachable engagement in the frame and means for normally holding said ends in operative connected positions upon said frame.

In testimony whereof I affix my signature.

FRED G. TERWILLIGER.